March 23, 1965  L. L. BURNS, JR  3,175,198
SUPERCONDUCTOR FILMS
Filed Oct. 2, 1962  4 Sheets-Sheet 1

INVENTOR.
LESLIE L. BURNS JR.
BY John V. Regan
ATTORNEY

INVENTOR.
LESLIE L. BURNS JR.

March 23, 1965     L. L. BURNS, JR     3,175,198
SUPERCONDUCTOR FILMS

Filed Oct. 2, 1962     4 Sheets-Sheet 4

INVENTOR.
LESLIE L. BURNS JR.
BY John V. Regan
ATTORNEY

United States Patent Office 3,175,198
Patented Mar. 23, 1965

3,175,198
SUPERCONDUCTOR FILMS
Leslie L. Burns, Jr., Princeton, N.J., assignor to Radio Corporation of America, a corporation of Delaware
Filed Oct. 2, 1962, Ser. No. 228,783
2 Claims. (Cl. 340—173.1)

This application is a continuation-in-part of application Serial No. 76,648, filed December 19, 1960, now abandoned.

This invention relates generally to the problem of providing superconductor films of highly uniform switching properties.

Superconductor films exhibit many desirable characteristics which are of interest in cryoelectric computer and other circuit applications. The films have low power dissipation, are of small size, exhibit relatively high switching speeds, and may be embodied in simple and potentially inexpensive circuits. One disadvantage of such films is the non-uniform switching properties they sometimes exhibit. It is found that the current (induced or applied) required to switch one magnetic film element in an array of such elements may be widely different from that required to switch another element in the same array. Variations as high as 300 percent have been reported and, even under highly controlled laboratory conditions, element-to-element uniformity within 10 percent is difficult to achieve. These wide variations unduly complicate the driving circuits and tend to restrict the number of elements that can be used in an array.

An object of the present invention is to provide a superconductor film which has highly uniform switching properties.

Another more specific object of the present invention is to provide a superconductor memory plane the storage elements of which are highly uniform with respect to the switching currents required to store different binary digits.

Another specific object of the present invention is to provide an improved cryotron structure.

The film structure of the present invention consists of two superconductor layers and a third layer formed of a non-superconducting material located between the two superconductor layers. While not restricted thereto, one specific form the invention may take is outer superconductor layers of tin and a center non-superconductor layer of silicon monoxide. The two outer layers switch as a unit. The three layers together may be quite thin—of the order of 3,000 Angstroms or less. The film structure is more than an order of magnitude more uniform with respect to switching properties than previous superconductor films and, as such, represents a major breakthrough in the solution of the problem of reliability and reproducibility of thin film superconductor circuits.

The invention is described in greater detail below and is illustrated in the following drawing of which:

Figure 3A:
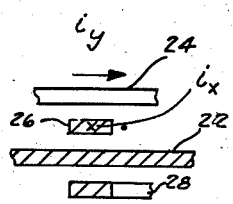
Figure 4:
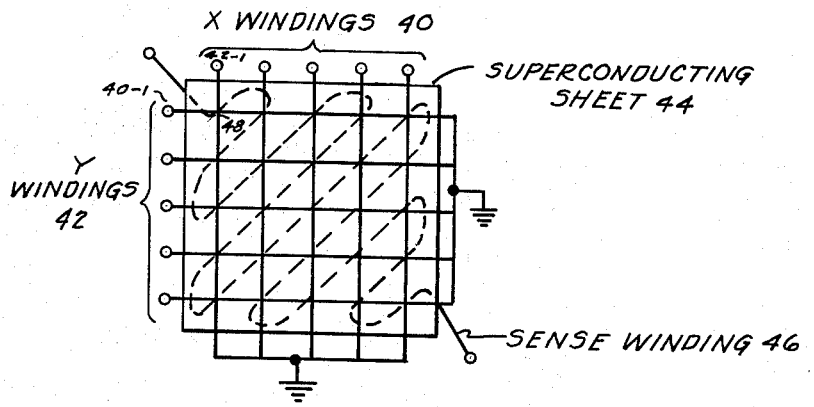
Figure 6:
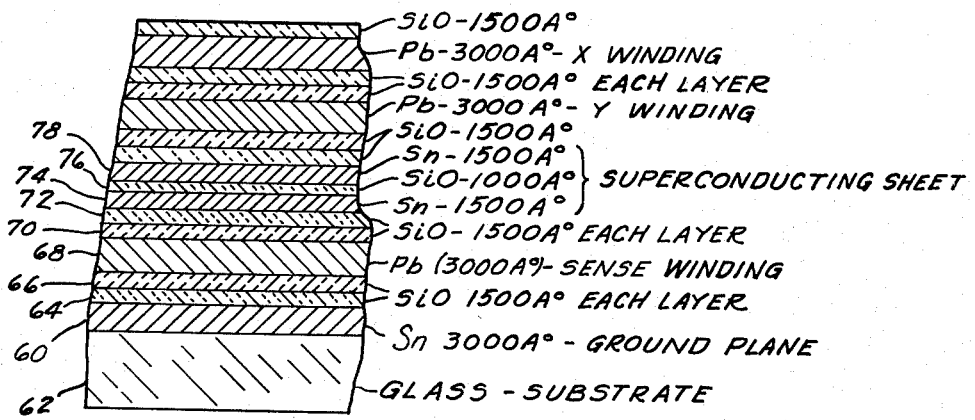
Figure 5:
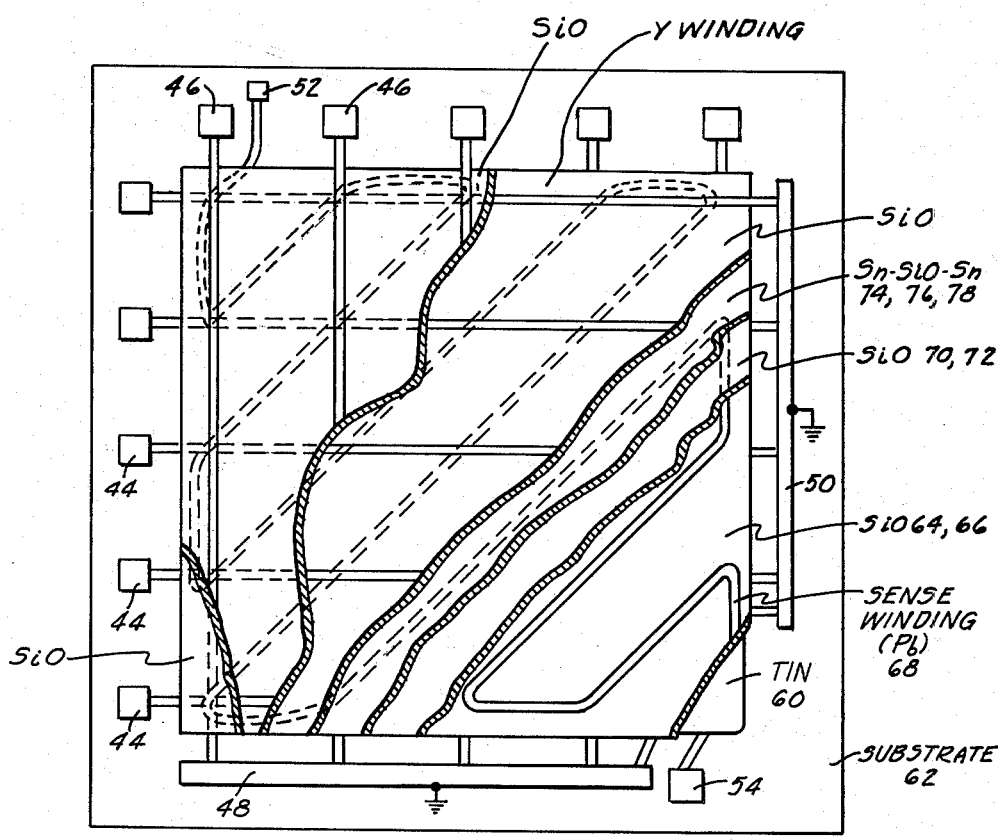
Figure 7:
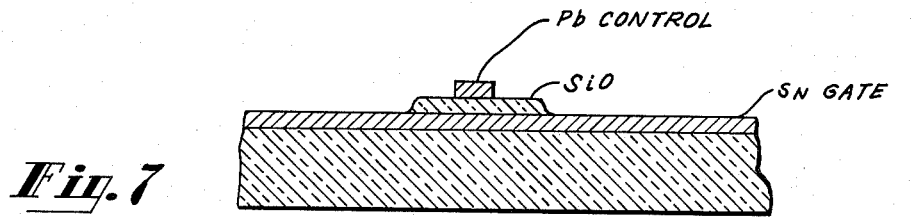
Figure 8:
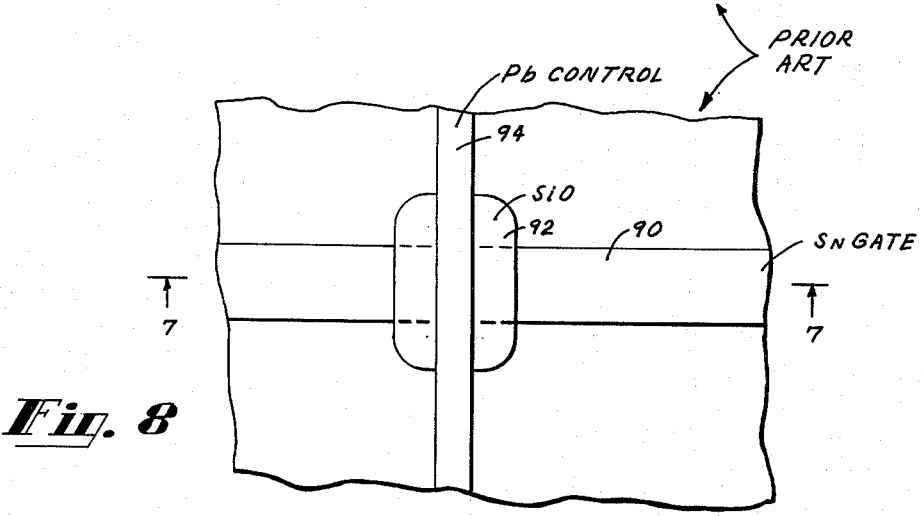
Figure 9:
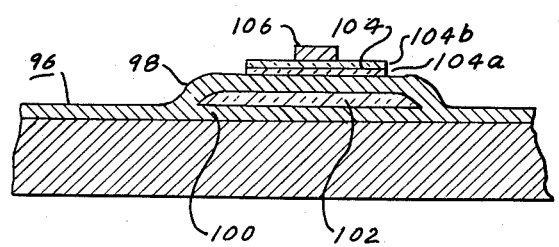

FIGS. 3a, b, c and d are drawings to explain the operation of a superconductor film memory;

FIG. 4 is a schematic showing of a superconductor film memory;

FIG. 5 is a partially cut away, plan view of a superconductor film memory;

FIG. 6 is an enlarged cross-section through a portion of the memory of FIG. 5 at a point at which an x, y and sense winding cross;

FIGS. 7 and 8 are cross-sectional and plan views, respectively, of a prior art thin film cryotron; and FIG. 9 is a cross-section through a thin film cryotron according to the present invention.

In the discussion which follows, similar reference numerals are applied to similar elements. Also, although not shown, it is to be understood that in operation the various films discussed are maintained at a low temperature, such as several degrees Kelvin, at which superconductivity is possible.

Figure 1:
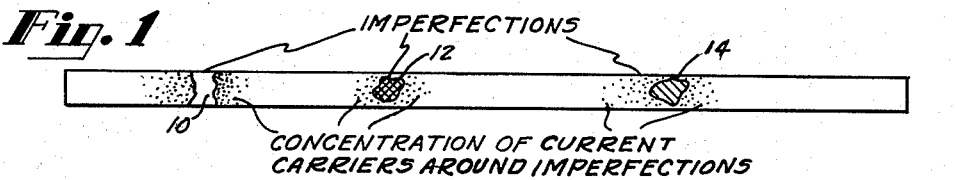
FIG. 1 is an enlarged cross-section of a conventional superconducting film (cross-hatching is omitted)

In many computer applications, it is necessary to switch a superconductor film such as shown in FIG. 1 between its superconducting and normal states. The switching may be accomplished by applying a current to the film. Alternatively, a current may be applied to a winding which is close to the film and the magnetic field produced by the winding caused to induce a current in the film. Switching occurs at a certain "critical" current density in the film.

It is believed that non-uniform switching of superconductor films may be due to imperfections present in the film. The imperfections are appropriately legended in FIG. 1, and may consist of pin holes such as shown at 10 or particles of foreign matter such as shown at 12 and 14. The imperfections are believed to cause undesired concentrations of current carriers which may prematurely exceed the critical current density of the film. The extent of current build-up in any area of the film depends upon the number of imperfections which are present in the area and the pattern in which the imperfections are arranged. These parameters vary both from film to film and also among different areas on the same film. Accordingly, as one would expect, the current required to produce the switching action varies both from film to film and between different places on the same film, in a random and unpredictable manner. Even when the vacuum deposition of a superconductor film is performed with extreme care, it is difficult to fabricate films which have switching characteristics as uniform as 10 percent between different areas on the same film.

The problem discussed above is solved according to the present invention by making the current carrier distribution uniform in the superconductor film which must be switched. There is substituted for the single film shown in FIG. 1 two superconductor layers such as shown at 16 and 18 in FIG. 2. The layers are spaced from one another by a non-superconducting layer such as shown at 20. The layer 20 may be an insulator, a semiconductor or a conductor. One preferred material is silicon monoxide. Other suitable materials are discussed in greater detail below. The structure shown in FIG. 2 has been found to have switching properties which are uniform to within one quarter of one percent. The switching actually may even be more uniform than this, however, one quarter of one percent is the accuracy of the test equipment employed to check the switching characteristics.

The theory of operation of the film structure of the present invention is believed to be as follows. Each of the superconductor layers of FIG. 2 includes imperfections just like the film of FIG. 1. However, the imperfections are randomly arranged and it is quite unlikely that an imperfection in one layer will be superimposed over an imperfection in the other layer. It is believed that the current carriers (either applied or induced) in the layers provide a mutually repelling force on one another and that this causes the carriers to distribute uniformly in the layers rather than to build up around the imperfections. Thus, the three layered film of FIG. 2 appears to act like a single, perfectly superconducting film (that is, one without any imperfections). In any case, regardless of whether this particular theory happens to be correct or not, film structures which have been built according to the invention have been found to have very closely reproducible switching performance.

Figure 2:
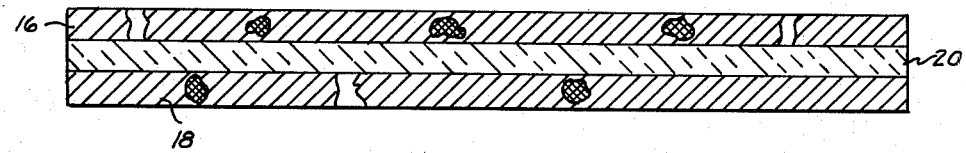
FIG. 2 is an enlarged cross-section of a superconductor film according to the present invention.

The overall thickness of the three layers such as shown in FIG. 2 need not be much greater than that of a single film in the prior art such as shown in FIG. 1. For example, memories such as described in detail later have been built which previously would have required a thin film plane 3,000 Angstrom thick, but which now employ the three layer film in which the tin layers corresponding to 16 and 18 of FIG. 2 are each 1500 Angstroms thick and the center layer, silicon monoxide, is 1,000 Angstroms thick (a total thickness of 4,000 Angstroms for the film structure). Moreover, the process of fabricating the film is quite simple. It is all done in vacuum—at a pressure of the order of $10^{-5}$ millimeters of mercury or less. The vacuum need not be broken between the deposition of the different films.

There are a large number of applications to which the present invention may be put. Two are discussed in detail herein. The first is a thin film superconductor memory and the second is a thin film cryotron.

Figure 3B:
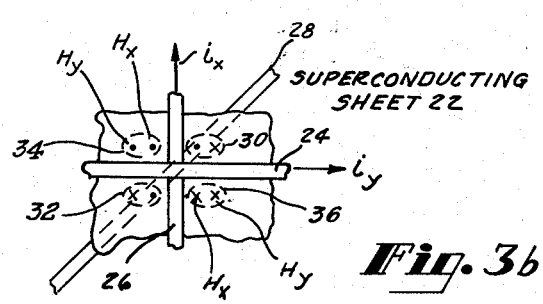

FIGS. 3a–3b help explain the principle of operation of a superconductor film magnetic memory. Element 22 in FIGS. 3a and 3b is a portion of a film plane in which circulating persistent currents are stored. According to the present invention, the film 22 is the three layer film of FIG. 2, however, only a single layer is shown to simplify the drawing. Element 24 is a thin film winding hereafter called the y winding and element 26 is a thin film winding hereafter called the x winding. The third winding of the memory is shown at 28 and it is a sense winding.

If currents $i_x$ and $i_y$ are applied to the x and y windings, respectively, in the direction indicated in FIG. 3b, a magnetic field is produced which surrounds each winding. Looking at FIG. 3b, the magnetic fields extend into and out of the paper. A magnetic field going into the paper is represented by a cross and one coming out of the paper by a point. In the areas 30 and 32 the magnetic fields $H_x$ and $H_y$ of the x and y windings, respectively, are in opposite directions and cancel. In the areas 34 and 36, the magnetic fields produced by the x and y windings are in the same directions and add.

Figure 3C:
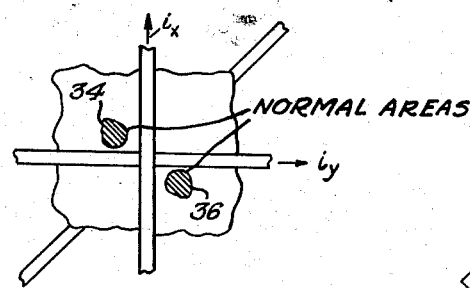

In the operation of a memory such as shown in FIG. 3b, the coincident currents applied to the x and y windings are of sufficient amplitude taken together to produce a magnetic field which exceeds the critical field of the superconductor in the areas 34 and 36. These areas switch from their superconducting to their normal state, as indicated by the cross-hatching in FIG. 3c. The magnetic field now penetrates the superconductor (in its superconducting state the film 22 acts as a shield to a magnetic field) and induces persistent circulating currents in the superconductor 22 which surround the areas 34 and 36.

Figure 3D:
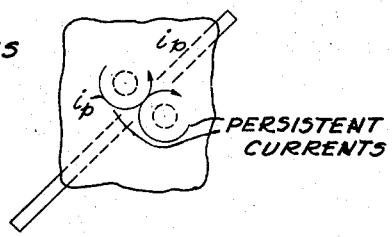

When the x and y drive currents are reduced to zero, the magnetic field surrounding the windings collapses, however, a persistent current remains in the superconductor and circulates in the direction shown in FIG. 3d. Persistent currents in these directions can be arbitrarily assumed to represent storage of the binary digit "one." If the polarity of drive current $i_x$ and $i_y$ is reversed, the persistent currents induced will circulate in directions opposite to those shown in FIG. 3d. This condition of opposite circulation is arbitrarily assumed to correspond to storage of the binary digit "zero."

A thin film superconductor memory employing memory cells such as shown in FIG. 3 is shown diagrammatically in FIG. 4. There are a plurality of x windings 40 and a plurality of y windings 42 which pass over and are insulated from one another. Beneath the x and y windings is a continuous film legended superconducting sheet 44 of FIG. 4. In a memory according to this invention sheet 44 is a three layered structure of the type shown in FIG. 2. A sense winding 46 is located beneath the film 44 and passes adjacent to each intersection of the x and y winding.

In operation, a binary digit "one" is written into a memory location such as 48 by applying currents in a given direction to windings 42–1 and 40–1 coincidentally. This induces circulating currents as already indicated. Opposite polarity currents are used for writing binary "zero." The digit stored in the memory may be read out by applying a read current to both of the windings 42–1 and 40–1 intersecting position 48. The read currents are applied in a given direction. For example, the read currents may be applied in the same direction as employed to write a "one." If a memory location is already storing a "one," the read currents applied induce currents at that location in directions opposite to those of the circulating currents. The location remains in the superconducting state and the magnetic field due to the read currents cannot penetrate the film 22. Therefore, no pulse is induced in the sense winding. When the read currents are removed, the circulating current again increases and continues to represent storage of a "one."

If a memory location is initially storing a "zero" and coincident read current pulses are applied in the "one" direction, then a read-out pulse is induced in the sense winding. The current induced in the memory location by the read pulses is initially in the same direction as the circulating currents. The sum of the induced and circulating currents exceeds the critical current of the film 22, the film goes normal, and the magnetic field of the drive currents passes through the film and induces a current pulse in the sense winding. When the read pulses are removed, persistent currents remain in the film at the given memory location. They circulate in directions opposite to those initially at the location and now represent the binary digit "one."

The actual memory construction using an array of the cells of FIG. 3 is shown in FIG. 5, and a portion of the memory is shown in cross-section in FIG. 6. FIG. 5 is believed to be self-explanatory. It operates in exactly the same way as the memory of FIG. 4. The squares 44 and 46 are known as "lands." They are conductive areas such as a drop of tin or lead on the substrate, and leads to other circuits may be connected to these lands. The lands 48 and 50 are common the y and x windings, respectively, and would normally be connected to a point of reference potential such as ground. The lands 52 and 54 are for the sense winding. The two tin layers of the memory plane need not be connected. However, in a preferred form of the invention they may be connected at an edge or in an external circuit to ground.

The process of manufacturing the memory of FIG. 5 is as follows. The substrate 62 such as one formed of glass is placed in a chamber and a number of baskets or crucibles containing the different materials which are to be vacuum evaporated onto the glass are also placed in the chamber. Means are provided or individually heating the crucibles and these heating means can be controlled from outside of the chamber. The chamber also includes a plurality of masks and means for accurately positioning the masks over the glass substrate. These means also are controllable from outside the chamber.

After all of the required materials are in the chamber, it is evacuated to a pressure of perhaps $10^{-6}$ millimeters of mercury. Then the crucible containing tin is heated and a tin layer 60 3,000 Angstroms thick is deposited on the substrate 62. Here and in other places in the discussion which follows, FIGS. 5 and 6 should be referred to. Next, the crucible containing silicon monoxide is heated and a layer 64 of silicon monoxide 1,500 Angstroms thick is evaporated onto the glass. Thereafter, dry nitrogen is introduced into the chamber in order to raise the pressure to atmospheric pressure and the dry nitrogen is thereafter removed from the chamber. When the pressure again reaches $10^{-6}$ millimeters of mercury, a second layer 66 of silicon monoxide 1,500 Angstroms thick is deposited over the first layer.

It might be appropriate here to discuss the reasons for using two thin layers of silicon monoxide rather than a single layer 3,000 Angstroms thick. A single layer of silicon monoxide 3,000 Angstroms thick is found to have pin holes. These are believed to be due to static charges which build up on the silicon monoxide layer. It is believed that these charges are dissipated when the silicon monoxide layer is brought up to atmospheric pressure. The pin holes, when present, provide a passage for the metal layers which are laid down later. This is highly undesirable since the passage permits conductive layers which should be insulated from one another to short circuit. It has been found that the procedure described results in an insulating layer which does not have pin holes extending from one surface to the opposite surface. It is believed that the thin films 64 and 66 do have pin holes individually but that the pin holes are randomly arranged and do not coincide with one another. Accordingly, the layer of metal which follows cannot pass through the the vacuum chamber during an interval between the deposition of layers 70 and 72.

After layer 66 has been deposited, a mask for the sense winding is moved into position over layer 66. The crucible of lead is then heated and a single film sense winding 68 (winding 46 of FIG. 4) 3,000 Angstroms thick is deposited through the mask and onto the silicon monoxide. In operating the memory, the sense winding 68 is always maintained in its superconducting condition. Accordingly, this winding can be one layer thick. Since the winding does not have to be switched between its normal and its superconducting states, the imperfections present in the winding have no undesirable effect on the operation of the memory.

The sense winding mask is now removed and a double silicon monoxide film 70, 72 is deposited in a manner already discussed. As in the previous case, dry nitrogen at atmospheric pressure is introduced and removed from the vacuum chamber during an interval between the deposition of layers 70 and 72.

The memory plane is the next film which is deposited. For this purpose, a tin layer 74 is deposited followed by a silicon monoxide layer followed by a tin layer 78. All evaporations are in vacuum and the chamber need not be raised to atmospheric pressure between layers 74, 76 and 78. The layer thicknesses are given in FIG. 6.

The remainder of the manufacturing procedure follows from the discussion above. The various layer thicknesses are shown in FIG. 6.

A known cryotron is shown in FIGS. 7 and 8. It includes a thin film superconductor gate winding 90, a layer of insulation 92 over a portion of the gate winding and a control winding 94 passing over the insulation and arranged at right angles to the gate winding. The gate winding is formed of tin and the control winding is formed of lead. In operation, a quiescent current passes through gate winding 90. This current can be sharply decreased in amplitude by applying a current pulse to the control winding 92. The effect of the current pulse is to produce a magnetic field around winding 94 and adjacent to the gate winding 90. The magnetic field induces a current in the gate winding 90 which, when added to the quiescent current flowing through the gate winding, is greater than the critical current of the gate winding. Accordingly, a portion of the latter switches to its normal state. This abruptly increases the resistance of the gate winding and the current through it sharply decreases.

An improved cryotron according to the present invention is shown in cross section in FIG. 9. The portion 96 of the gate winding which is required to switch between normal and superconducting states is formed of two films 98 and 100 separated from one another by a nonsuperconducting film 102 which may be silicon monoxide. The manufacturing process is exactly like that of the memory. Also, the insulation 104 between the gate and control windings is formed with two layers 104a and 104b in the manner already described. This permits the insulation layer to be extremely thin thereby providing very good coupling between the control and gate windings. The control winding 106 is a single layer since it remains superconducting and imperfections in this winding do not affect the circuit operation.

The operation of the cryotron of FIG. 9 is like that of the cryotron shown in FIGS. 7 and 8. The plan view is also similar to the view of FIG. 8. The important advantage of the cryotron of FIG. 9 is its very uniform switching characteristics from cryotron to cryotron. Also, the insulation layer can be made very thin thereby permitting very close control winding-gate winding coupling.

There are a large number of materials which may be employed in the present invention. The superconductor layers 16, 18 of FIG. 2 can both be of the same material. This material may be tin, lead, niobium, or other superconductor material that can be deposited in thin film form including alloys and compounds. The film 20 of FIG. 2 can be an insulator such as silicon monoxide, silicon dioxide, magnesium fluoride, or other insulator that can be deposited in thin film form. Silicon monoxide is a preferred material for use for superconducting temperatures because it is relatively easy to deposit and does not craze at the temperatures involved. Alternatively, element 20 can be a semiconductor such as extrinsic germanium, or a semiconductor compound. Semiconductor materials such as extrinsic germanium which have extremely high resistivities (of the order of $10^8$ ohm centimeters for some types of germanium) at the temperatures involved, 4° Kelvin or so, can be employed as the insulating layer in a superconductor memory or in a cryotron. These materials can be substituted for layers 104 of FIG. 9 or layer 92 of FIG. 8. As a third alternative, layer 20 may be a metal such as copper, gold, indium, or silver, or a superconductor which remains in its normal state when the two outer films are superconducting.

What is claimed is:

1. A cryoelectric circuit element to be switched between superconducting and normal states comprising a laminated film structure consisting of two outer superconducting films of the same material, and a center film formed of a semiconductor material; and means for generating a magnetic field coupled to said element for switching corresponding portions of the two superconductor films, in unison, between said two states.

2. In a cryoelectric memory including a memory plane, $x$ and $y$ drive lines coupled to said plane for inducing persistent circulating currents in the plane in response to currents applied to the drive lines, and sensing means coupled to the plane in which a sense signal is induced whenever a memory location is driven normal, an improved construction for said memory plane comprising a laminated structure which includes two outer superconductor films of the same material and a center insulator film.

References Cited by the Examiner
UNITED STATES PATENTS 3,059,196 10/62 Lentz _____ 340—173.1
3,094,685 6/63 Crowe _____ 340—173.1

OTHER REFERENCES

IBM Technical Disclosure Bulletin, vol. 3, No. 2, page 73, July 1960.

IBM Technical Disclosure Bulletin, vol. 4, No. 5, page 36, October 1960.

IRVING L. SRAGOW, *Primary Examiner.*